I. LIGHTCAP.
PIPE LINE SYSTEM.
APPLICATION FILED MAY 26, 1910.
973,794.
Patented Oct. 25, 1910.
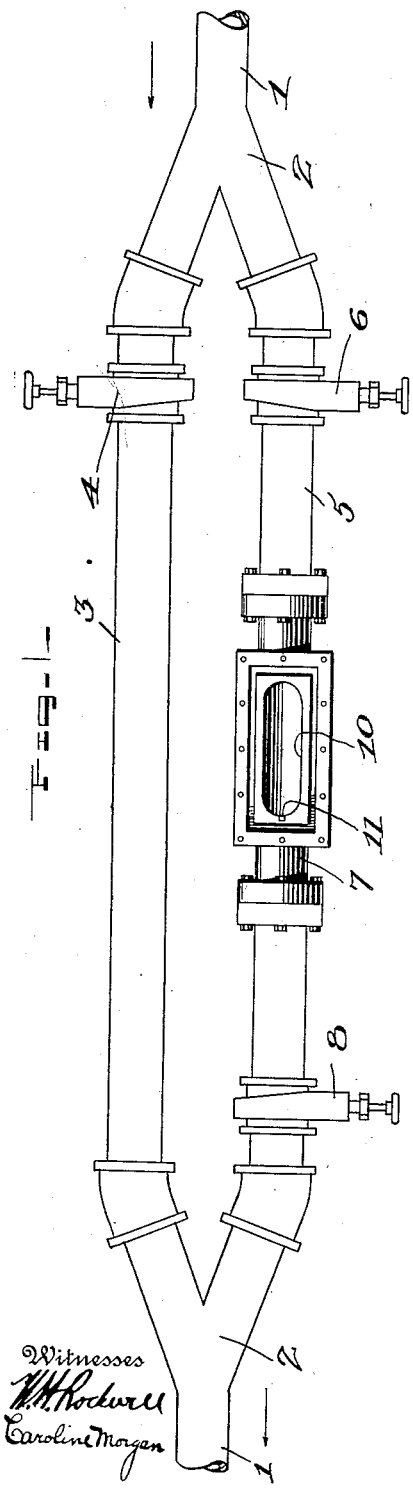
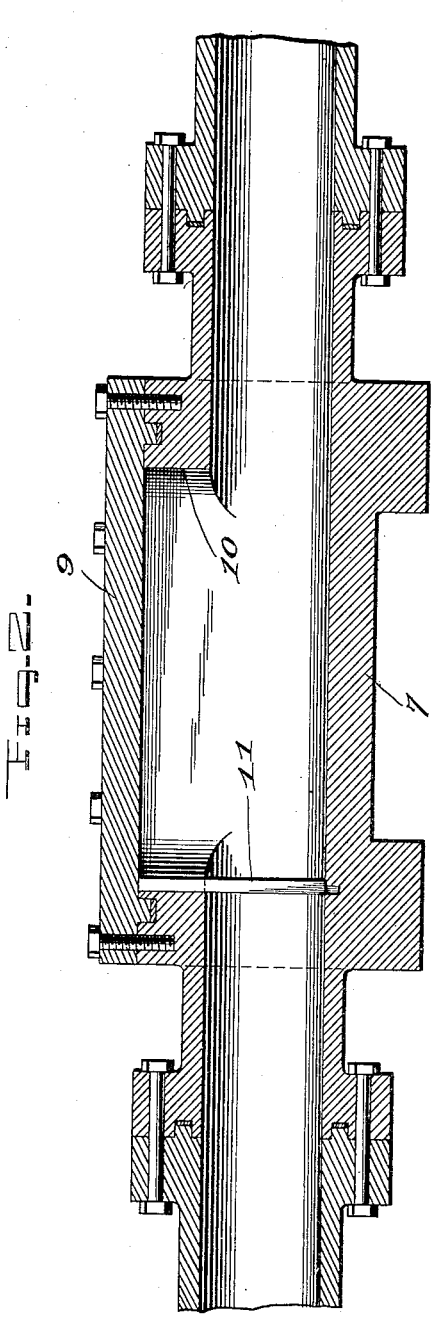
Inventor
Isaac Lightcap
By Langdon Moore
Attorney
Witnesses
W. H. Rockwell
Caroline Morgan

UNITED STATES PATENT OFFICE.

ISAAC LIGHTCAP, OF ROCKSBURG, NEW JERSEY.

PIPE-LINE SYSTEM.

973,794.

Specification of Letters Patent. Patented Oct. 25, 1910.

Application filed May 26, 1910. Serial No. 563,533.

*To all whom it may concern:*

Be it known that I, ISAAC LIGHTCAP, a citizen of the United States, residing at Rocksburg, in the county of Warren and State of New Jersey, have invented new and useful Improvements in Pipe-Line Systems, of which the following is a specification.

This invention relates to improvements in oil pipe line systems, and more particularly to a particular construction for the removal or insertion of the pipe scrapers.

The object of this invention is to provide a means by which a pipe scraper may be removed or inserted in a pipe line system without stopping the flow of the oil through the system or interfering in any other way with the operation of the pipe line.

In the operation of oil pipe line systems, it is necessary from time to time to scrape or clean the interior of the pipes and this is usually done by placing a scraper in the pipe at the beginning of the system and allow the force of the oil to carry the scraper along with it to the other end of the pipe line. To accomplish this heretofore it has been necessary to cut off the flow through the pipe line while the scraper is being inserted and to again cut off the flow when the scraper is being removed. The advantages of providing a means by which the scraper can be inserted or removed from the pipe line without causing the operation of the system to be suspended is obvious. Furthermore in a long pipe line it may be desirable to inspect the scraper from time to time during its travel through the pipe line in order to determine whether or not it has become sufficiently worn or defaced to interfere with its proper operation. This may be accomplished by placing this improved means in the pipe lines at different points along its length, so that the scraper may be inspected and if damaged a new one may be inserted to complete the cleaning or scraping operation, and this may be done without interfering with the operation of the pipe line.

While the preferred form of this invention is illustrated in the accompanying sheets of drawing, yet it is to be understood that minor detail changes may be made without departing from the scope thereof.

Figure 1 is a top plan view of that portion of an oil pipe line in which this invention has been applied. Fig. 2 is a view in vertical longitudinal section through the scraper trap forming a part of this invention.

To carry out this invention a by-pass is formed in the main pipe line 1 at such points where it is desirable to insert, remove or inspect a pipe line scraper, and as illustrated in Fig. 1, the by-pass is provided with a scraper trap. The flow of the oil as indicated by the arrows and in the illustration is from right to the left. The by-pass is connected to the main pipe line by Y joints 2 with the tail of the Y joining the main line, so that the flow may be diverted or equally divided between the arms of the Y. In Fig. 1, the main flow is designed to pass through the upper branch 3 which is provided with a valve 4 just beyond its connection with the arm of the Y. A by-pass 5 forms the lower branch and is likewise provided with a valve 6 just beyond its connection with its arm of the Y joint. It is preferable that the two branches 3 and 5 extend parallel with each other a sufficient distance for the insertion of a scraper trap 7 in the by-pass or lower branch 5 and the insertion of a valve 8 on the further side of the scraper trap. The two branches are then joined to the main line by a Y joint with its arms in connection with the two branches and its tail in connection with the main line.

The scraper trap 7 is provided with a removable cover 9 closing an opening 10 corresponding in width to the interior of the pipe and of sufficient length for the removal or insertion of a scraper. The discharge end of the trap is provided with a removable partition 11, illustrated in the drawing as a centrally located bar, engaging a recess in the bottom of the trap and a recess in the top of the end wall of the upper portion of the trap.

During the ordinary operation of the system, the valve 4 in the upper branch forming the main line will remain open and the valves 6 and 8 in the by-pass or lower branch will be closed, so that the oil will flow in an uninterrupted manner by the by-pass. When it is desired to insert a scraper, the cover 9 to the scraper trap 7 is removed, the removable partition 11 at the discharge end of the trap is taken out, a scraper inserted, and forced into the pipe leading from the discharge end. The removable partition 11 is then replaced and the cover 9 secured over the opening 10 in the trap 7. The valves 6 and 8 in the by-pass are opened as the valve 4 in the upper branch or main line is closed, and the force of the flow of oil which is now carried through the by-pass will carry the scraper on with it. After a sufficient time has expired to allow the scraper to travel beyond the by-pass, the valve 4 in the main line or upper branch is opened as the valves 6 and 8 in the by-pass are closed, and by this means the scraper is inserted in the pipe line without interfering with the flow of the oil. When it is known that a scraper has been placed in the system and it is desired to inspect the scraper at some point therein where a by-pass has been installed, the main line or upper branch will be gradually cut off by its valve as the valves in the by-pass or lower branch are opened, so that the oil will flow through the by-pass. When the scraper reaches the Y joint, the oil backed up in the arm leading to the cut off branch will direct it into the lower free arm entering the by-pass and trap, so that the scraper will be stopped by its coming in contact with the removable partition in the trap. When sufficient time has elapsed to allow the scraper to enter the trap or when its arrival has been announced by the sound of its contact with the removable partition, the valves in the by-pass or lower branch are gradually closed as the valve in the upper branch is gradually opened, so that the flow of oil from the main line through either of the two branches will be uninterrupted. The top of the trap is removed and the scraper inspected and sent on its way as above described, or removed and the top of the trap replaced.

What I claim is:—

1. In a pipe line system, means for inserting and removing a pipe scraper comprising a by-pass including a scraper trap provided with means preventing the passage of a scraper therethrough, and means to divert the entire flow from the main line through the by-pass.

2. In a pipe line system, means for inserting and removing a pipe scraper, comprising a by-pass including a scraper trap provided with means preventing the passage of a scraper therethrough, means to divert the entire flow from the main line through the by-pass, and means upon each side of the scraper trap adapted to cut off the by-pass from the main line.

3. In a pipe line system, means for inserting and removing a pipe scraper, comprising a scraper trap having an opening in the top thereof corresponding in width to the width of the pipe in the pipe line and of greater length than the scraper, a removable cover therefor, a removable obstruction at the discharge end of the trap, means for diverting the flow of the main line through the trap, and means adapted to cut off the trap from the main line.

ISAAC LIGHTCAP.

Witnesses:
 FRANK BACHMAN,
 J. FLETCHER BLAZIER.